(12) United States Patent
Li et al.

(10) Patent No.: US 12,385,554 B2
(45) Date of Patent: Aug. 12, 2025

(54) DUAL-MOTOR DRIVING SYSTEM ASSEMBLY AND VEHICLE

(71) Applicant: Jing-Jin Electric Technologies Co., Ltd., Beijing (CN)

(72) Inventors: Jianwen Li, Beijing (CN); Fei Wang, Beijing (CN); Ping Yu, Beijing (CN)

(73) Assignee: Jing-Jin Electric Technologies Co., Ltd., Beijing (CN)

( * ) Notice: Subject to any disclaimer, the term of this patent is extended or adjusted under 35 U.S.C. 154(b) by 23 days.

(21) Appl. No.: 18/262,826

(22) PCT Filed: Jun. 8, 2021

(86) PCT No.: PCT/CN2021/098931
§ 371 (c)(1),
(2) Date: Jul. 25, 2023

(87) PCT Pub. No.: WO2022/160551
PCT Pub. Date: Aug. 4, 2022

(65) Prior Publication Data
US 2024/0093768 A1     Mar. 21, 2024

(30) Foreign Application Priority Data
Feb. 1, 2021  (CN) .......................... 202110138813.7

(51) Int. Cl.
*F16H 37/08*  (2006.01)
*B60K 1/02*  (2006.01)
(Continued)

(52) U.S. Cl.
CPC ........... *F16H 37/0806* (2013.01); *B60K 1/02* (2013.01); *B60K 17/16* (2013.01); *B60K 25/06* (2013.01);
(Continued)

(58) Field of Classification Search
CPC ...... F16H 37/0806; F16H 48/24; F16H 48/34; F16H 57/025; F16H 2057/02026;
(Continued)

(56) References Cited

U.S. PATENT DOCUMENTS 7,497,285 B1 * 3/2009 Radev ...................... B60K 6/52
  180/65.23
11,180,013 B1 * 11/2021 Yu .......................... B60K 17/06
(Continued)

FOREIGN PATENT DOCUMENTS

CN       102112333 A     6/2011
CN       101519040 B    12/2012
(Continued)

OTHER PUBLICATIONS

Li, EP-3738815-A1, Machine Translation of Specification (Year: 2020).*
(Continued)

*Primary Examiner* — Paul N Dickson
*Assistant Examiner* — Matthew Joseph Ganci
(74) *Attorney, Agent, or Firm* — BUCHANAN, INGERSOLL & ROONEY PC

(57) ABSTRACT

A dual-motor drive assembly and a vehicle are disclosed. The dual-motor drive assembly comprises a first motor and a second motor arranged coaxially, a first gear transmission, a second gear transmission, and one or more idle gear pairs. The first gear transmission is driven by the first motor, and the second gear transmission is driven by the second motor. The idle gear pairs are respectively arranged in the first gear transmission and the second gear transmission and are configured to increase a distance between an output shaft of the first motor and an end shaft of the first gear transmission.

14 Claims, 2 Drawing Sheets

(51) Int. Cl.
*B60K 17/16* (2006.01)
*B60K 25/06* (2006.01)
*F16H 48/24* (2006.01)
*F16H 48/34* (2012.01)
*F16H 57/02* (2012.01)
*F16H 57/025* (2012.01)
*F16H 57/037* (2012.01)
*F16H 63/34* (2006.01)

(52) U.S. Cl.
CPC ............. *F16H 48/24* (2013.01); *F16H 48/34* (2013.01); *F16H 57/025* (2013.01); *F16H 57/037* (2013.01); *F16H 63/3425* (2013.01); *F16H 2057/02026* (2013.01); *F16H 2057/02034* (2013.01); *F16H 2057/02052* (2013.01)

(58) Field of Classification Search
CPC . F16H 2057/02034; F16H 2057/02052; B60K 1/02; B60K 17/16; B60K 25/06; B60K 2007/0061; B60K 17/04
See application file for complete search history.

(56) References Cited

U.S. PATENT DOCUMENTS

| | | | |
|---|---|---|---|
| 2011/0139522 | A1 | 6/2011 | Takenaka et al. |
| 2020/0406996 | A1 | 12/2020 | Kohigashi et al. |
| 2024/0093768 | A1 | 3/2024 | Li et al. |

FOREIGN PATENT DOCUMENTS

| | | | | |
|---|---|---|---|---|
| CN | 109664740 | A | 4/2019 | |
| CN | 210733716 | U | 6/2020 | |
| CN | 211335437 | U | 8/2020 | |
| CN | 211519235 | U | 9/2020 | |
| CN | 111762010 | A | 10/2020 | |
| CN | 112277611 | A | 1/2021 | |
| CN | 112721620 | A | 4/2021 | |
| CN | 214775371 | U | 11/2021 | |
| DE | 102018131494 | A1 | 2/2019 | |
| EP | 3357731 | A1 | 8/2018 | |
| EP | 3527414 | A1 | 8/2019 | |
| EP | 3738815 | A1 * | 11/2020 | ............... B60K 1/02 |
| JP | H06105516 | A | 4/1994 | |
| JP | 201048380 | A | 3/2010 | |
| JP | 2017159817 | A | 9/2017 | |
| JP | 2020-65380 | A | 4/2020 | |
| WO | 0035698 | A1 | 6/2000 | |
| WO | 2010021413 | A2 | 2/2010 | |

OTHER PUBLICATIONS

International Search Report (PCT/ISA/210) with translation and Written Opinion (PCT/ISA/237) mailed on Oct. 11, 2021 by the China National Intellectual Property Administration (ISA/CN) as the International Searching Authority for International Application No. PCT/CN2021/098931. (10 pages).

Search Report dated Aug. 8, 2024 by the Chinese Patent and Trademark Office in corresponding Chinese Application No. 2021101388137, 5 pages.

Extended European Search Report dated Apr. 15, 2024, issued by the European Patent Office in corresponding European Application No. 21922149.6-1009, (4 pages).

Office Action (Notice of Reasons for Refusal) issued on Jun. 13, 2024, by the Japanese Patent Office in corresponding Japanese Patent Application No. 2023-545186, and an English Translation of the Office Action. (8 pages).

Office Action (Notice of Reasons for Refusal) issued on Sep. 18, 2024, by the Japanese Patent Office in corresponding Japanese Patent Application No. 2023-545186, and an English Translation of the Office Action. (9 pages).

* cited by examiner

DUAL-MOTOR DRIVING SYSTEM ASSEMBLY AND VEHICLE

TECHNICAL FIELD

The present disclosure belongs to the technical field of power drive design, and particularly relates to a dual-motor drive assembly and a vehicle.

BACKGROUND

At present, there are mainly two kinds of drive system of pure electric vehicles: single motor centralized drive and multi-motor distributed drive. The current pure electric vehicles on the market mostly adopt the centralized drive scheme, in which the driving force of the motor is connected to the differential through gears, shafts, etc., and is roughly evenly distributed to the left and right half shafts, and it is impossible to independently control a single wheel. Compared with the electric vehicle with single motor centralized drive, the dual-motor distributed independent wheel drive has the advantages of compact structure, convenient layout and excellent vehicle driving flexibility. The design of the dual-motor independent drive system needs to consider the spatial layout, the forces applied on each shaft system of the reducer, etc.

Some application scenarios of the dual-motor drive system need a large center distance between the input and output shafts to satisfy the installation and layout of the drive axle space, for example, adding some accessories in the large center distance space to increase the product diversity. When the two-stage gear transmission is adopted, if a larger center distance is provided, the diameter of the driven gear needs to be increased, resulting in an increase in the enclosure of the power assembly, which cannot meet the requirements of installation and layout. If the three-stage gear transmission is adopted, there will be many disadvantages, for example, the number of gears will increase, the axial width of the power assembly will increase, and the cost will increase.

SUMMARY

In view of the above problems, the present disclosure provides a dual-motor drive assembly and a vehicle to overcome the above problems or at least partially solve the above problems.

In order to achieve the above object, the present disclosure adopts the following technical solutions.

An aspect of the present disclosure provides a dual-motor drive assembly. The dual-motor drive assembly comprises: a first motor and a second motor arranged coaxially, a first gear transmission, a second gear transmission and one or more idle gear pairs. The first gear transmission is driven by the first motor, and the second gear transmission is driven by the second motor. The idle gear pairs are respectively arranged in the first gear transmission and the second gear transmission and are configured to increase a distance between an output shaft of the first motor and an end shaft of the first gear transmission.

Optionally, the first gear transmission and the second gear transmission are each a two-stage gear transmission, gears of corresponding stages in the first gear transmission and the second gear transmission are arranged on a same axis, and the idle gear pairs are respectively arranged between the first stage gears pair of the first gear transmission and between the first stage gears pair of the second gear transmission, and/or the idle gear pairs are respectively arranged between the second stage gears pairs of the first gear transmission and between the second stage gears pair of the second gear transmission.

Optionally, the first gear transmission and the second gear transmission respectively comprise a first stage pinion, a first stage gear, a second stage pinion and a second stage gear, and there is one idle gear pair which is arranged between the first stage pinions and the first stage gears.

Optionally, the dual-motor drive assembly further comprises a differential locking mechanism, the differential locking mechanism is arranged between an output shaft of the first motor and an output shaft of the second motor, or between two shafts of the idle gear pair, or between gear shafts of each stage.

Optionally, the differential locking mechanism comprises a movable toothed disc assembly, a fixed toothed disc assembly, a fixed electromagnetic coil and a return spring;

the movable toothed disc assembly is slidably connected with the motor output shaft or the shaft of the idle gear or the gear shaft on one side by a spline, and the fixed toothed disc assembly is fixedly connected with the motor output shaft or the shaft of the idle gear or the gear shaft on the other side by a spline;

the fixed electromagnetic coil is fixedly arranged on a casing adjacent to the movable toothed disc assembly; and the return spring is arranged between the movable toothed disc assembly and the motor output shaft or the shaft of the idle gear or the gear shaft which is on the same side with the movable toothed disc assembly.

Optionally, the dual-motor drive assembly further comprises a parking mechanism, the parking mechanism comprises a parking gear, a parking pawl and a parking actuator, and the parking gear is integrated on a fixed toothed disc of the fixed toothed disc assembly.

Optionally, the dual-motor drive assembly further comprises a cycloid pump, an inner rotor of the cycloid pump is fixed on the shaft of the idle gear, and an outer rotor of the cycloid pump is meshed with the inner rotor of the cycloid pump.

Optionally, the first gear transmission and the second gear transmission are arranged in a transmission casing, and the first motor and the second motor are fixedly connected to two sides of the transmission casing respectively; and the transmission casing is arranged on a support bracket, and a vehicle frame is also arranged on the support bracket, and a wheel is connected with the support bracket through a rocker arm.

Optionally, bearings of the first motor and the second motor are respectively arranged on two sides of a rotor in a motor casing, and are respectively located within an axial length range of outgoing lines of a stator of the first motor and a stator of the second motor; and ends of the output shaft of the first motor and the output shaft of the second motor are respectively provided with a shaft auxiliary bearing of the first motor and a shaft auxiliary bearing of the second motor.

Another aspect of the present disclosure also provides a vehicle comprising the dual-motor drive assembly described in any of the above items.

The advantages and beneficial effects of the present disclosure are as follows.

The center distance between the input and output shafts is increased by adding idle gears, thereby meeting the demand for a larger center distance.

Further, by making full use of the available axial space generated by adding idle gears the electromagnetic differential locking mechanism (clutch) or mechanical oil pump (cycloid pump) can be arranged, and the increase of the above functional components will not increase the axial size.

In addition, the above differential locking clutch can be arranged on the shaft of the idle gear or the motor shaft according to different application requirements, and can independently adjust the operation status of each drive wheel to increase the flexibility of vehicle driving. By providing the differential locking function, when getting out of trouble or driving off-road, the driving force of two motors can be reasonably coupled to improve the ability of getting out of trouble. By providing the parking function (the P gear shift), the parking safety and reliability can be improved. By providing the mechanical cycloid pump, the lubrication and cooling of the drive system can be improved, thereby improving the overall efficiency of the drive system.

BRIEF DESCRIPTION OF DRAWINGS

By reading the detailed description of the preferred embodiments below, various other advantages and benefits will become clear to a person of ordinary skill in the art. The accompanying drawings are only used for the purpose of illustrating the preferred embodiments, and should not be considered as a limitation to the present disclosure. Moreover, throughout the drawings, the same reference numerals are used to denote the same components. In the drawings.

Figure 1:
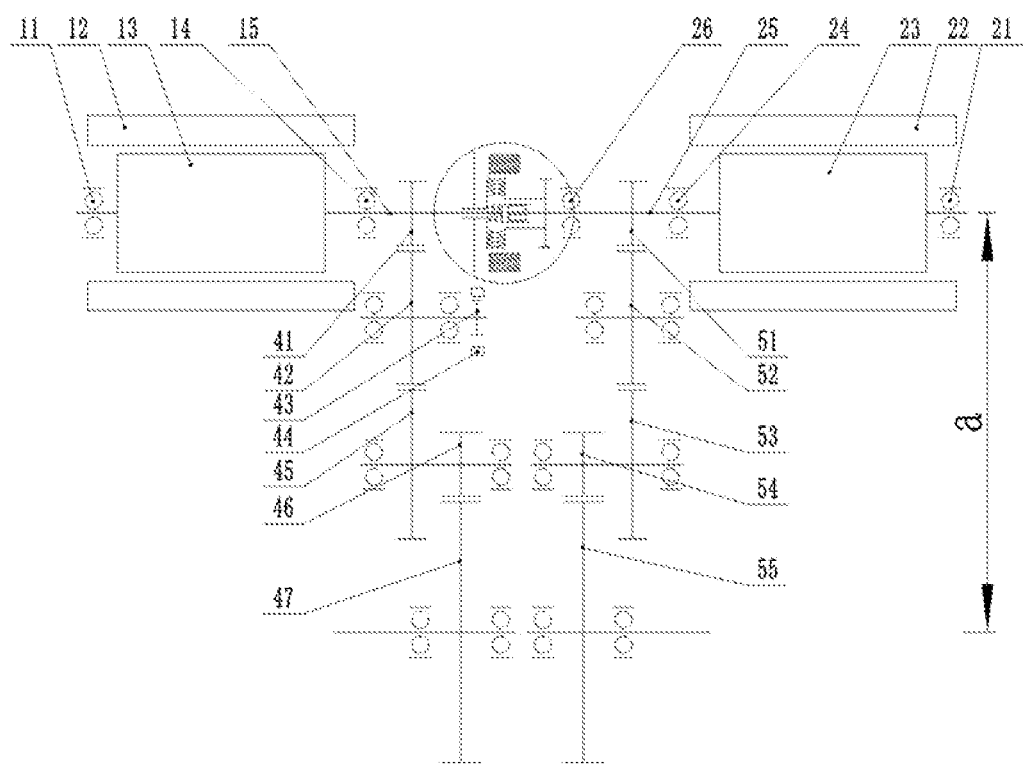
FIG. 1 is a schematic diagram of the structure of a dual-motor drive assembly according to an embodiment of the present disclosure.

In the drawings:
- 11, a rear bearing of a first motor; 12, a stator of the first motor; 13, a rotor of the first motor; 14, a main bearing of the first motor; 15, an output shaft of the first motor; 16, a shaft auxiliary bearing of the first motor;
- 21, a rear bearing of a second motor; 22, a stator of the second motor; 23, a rotor of the second motor; 24, a main bearing of the second motor; 25, an output shaft of the second motor; 26, a shaft auxiliary bearing of the second motor;
- 31, a movable toothed disc assembly; 32, a return spring; 33, a fixed electromagnetic coil; 34, an auxiliary support bearing; 35, a fixed toothed disc assembly;
- 41, a first stage pinion I; 42, an idle gear I; 43, an inner rotor of a cycloid pump; 44, an outer rotor of the cycloid pump; 45, a first stage gear I; 46, a second stage pinion I; 47, a second stage gear I;
- 51, a first stage pinion II; 52, an idle gear II; 53, a first stage gear II; 54, a second stage pinion II; 55, a second stage gear II.

DETAILED DESCRIPTION

In order to make the object, technical solutions, and advantages of the present disclosure clearer, the present disclosure will be described clearly and completely in conjunction with the specific embodiments and corresponding drawings. Obviously, the embodiments described are only part of rather than all of the embodiments of the present disclosure. Based on the embodiments in the present disclosure, all other embodiments obtained by those of ordinary skill in the art without paying creative work shall fall within the protection scope of the present disclosure.

It should be understood that the terms "comprise/include", "consist of" or any other variants are intended to cover non-exclusive inclusion, so that the product, apparatus, process or method including a series of elements may not only include those elements, but may also include other elements not stated explicitly, or elements inherent to the product, apparatus, process or method. Without more limitations, an element defined by the phrase "comprise/include" or "consist of" does not exclude the case that there are other same elements in the product, apparatus, process or method including the element.

It should also be understood that, orientation or positional relationship indicated by the terms "upper", "lower", "front", "rear", "left", "right", "top", "bottom", "inner", "outer", etc. are orientation or positional relationship based on the drawings, which are merely for convenience of describing the present disclosure and simplifying the description, rather than indicating or implying that the device, component or structure referred to must have a specific orientation, or must be constructed and operated with a specific orientation, they should not be construed as limiting the present disclosure.

In the present disclosure, unless otherwise expressly specified and defined, the terms "installed", "connected", "fixed" and the like should be understood in a broad sense, for example, it may be fixedly connected, or removably connected, or integrally connected; it may also be mechanically connected or electrically connected; it may also be directly connected or indirectly connected through a middleware; it may also be internally communicated or interacted between two components. For a person of ordinary skill in the art, the specific meaning of these terms in the present disclosure should be understood according to specific situations.

The technical concept of the present disclosure is as follows. By adding intermediate idle gears in the drive assembly, the demand for increasing the center distance between the input and output shafts can be met. The center distance can be a horizontal distance between the two shafts, or the linear distance between the center lines of the two shafts. In addition, by making use of the effective space in the drive assembly to arrange other accessories (such as mechanical oil pump, differential locking clutch, etc.), the demand for diversity of the vehicle can be met.

The technical solutions provided by the embodiments of the present disclosure are described in detail with the accompanying drawings.

Figure 2:
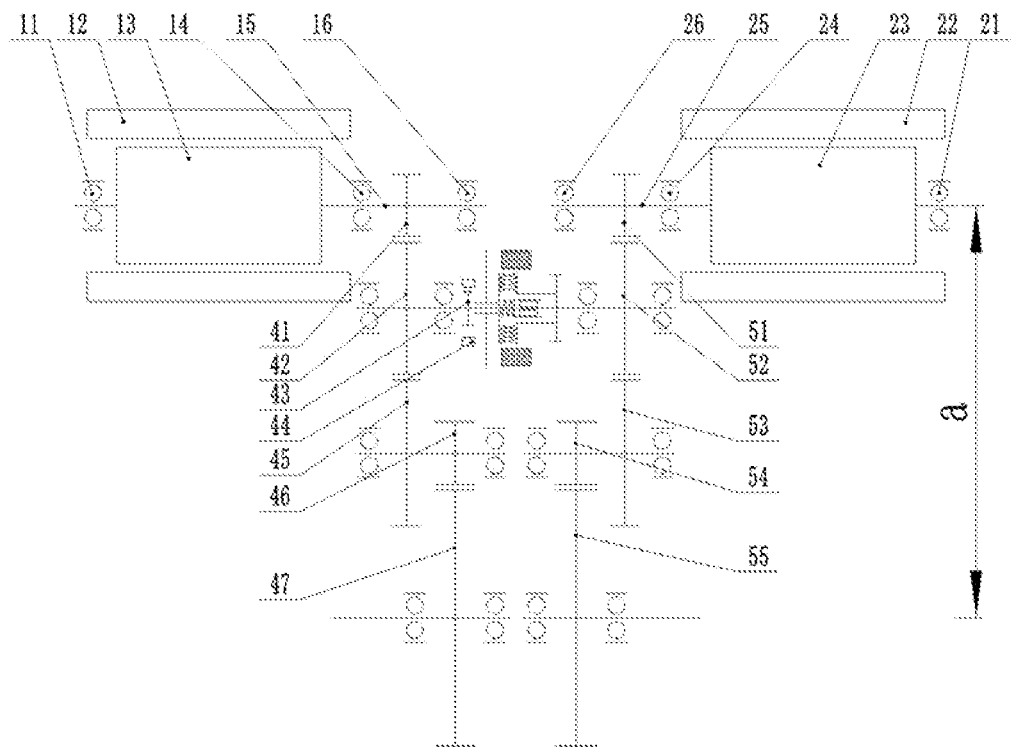
FIG. 2 is a schematic diagram of the structure of a dual-motor drive assembly according to another embodiment of the present disclosure.

Refer to FIG. 1 and FIG. 2, the dual-motor drive assembly comprises: a first motor and a second motor arranged coaxially, a first gear transmission, a second gear transmission, and one or more idle gear pairs (42, 52). The first gear transmission is driven by the first motor, and the second gear transmission is driven by the second motor. The idle gear pairs (42, 52) are respectively arranged in the first gear transmission and the second gear transmission and are configured to increase a distance a between an output shaft of the first motor and an end shaft of the first gear transmission.

In the above embodiment, by adding idle gears in the gear transmission chain, the distance of the gear transmission in the horizontal direction is increased, that is, the distance a between the output shafts of the first and second motors and the end shafts of the first and second gear transmissions is increased, thereby providing more space for adding other functional components (such as a differential locking mechanism and a cycloid pump) in the casing of the drive system, and providing other components (such as a vehicle frame) on a support bracket where the casing of the drive system is located.

In a preferred embodiment, refer to FIG. 1, the first gear transmission and the second gear transmission are each a two-stage gear transmission, gears of corresponding stages in the first gear transmission and the second gear transmission are arranged on a same axis, and the idle gear pairs (42, 52) are respectively arranged between a pair of first stage gears, and/or between a pair of second stage gears. Preferably, the idle gear pairs (42, 52) are also arranged coaxially, so that the structure is symmetrical, and a better balance effect can be obtained.

Specifically, the first gear transmission and the second gear transmission respectively comprise a first stage pinion (41, 51), a first stage gear (45, 53), a second stage pinion (46, 54) and a second stage gear (47, 55), and there is one idle gear pair (42, 52) which is arranged between the first stage pinion (41, 51) and the first stage gear (45, 53).

In an embodiment, the dual-motor drive assembly further comprises a differential locking mechanism, which may be electromagnetic clutch type or other forms. The locking mechanism is configured to lock the output shafts of the first motor and the second motor into a same shaft and couple their output forces, so as to improve the output power of the vehicle. It is especially applicable to the situation that the wheels are bogged in swamps, bogs and so on, and can improve their ability to get out of trouble.

The above differential locking mechanism is arranged between the output shaft of the first motor and the output shaft of the second motor, or between the two shafts of the idle gear pair, or between the gear shafts of each stage. Preferably, it is arranged between the output shaft of the first motor and the output shaft of the second motor, or between the two shafts of the idle gear pair, which has higher locking efficiency and less impact on the axial length of the casing manufactured.

Figure 3:
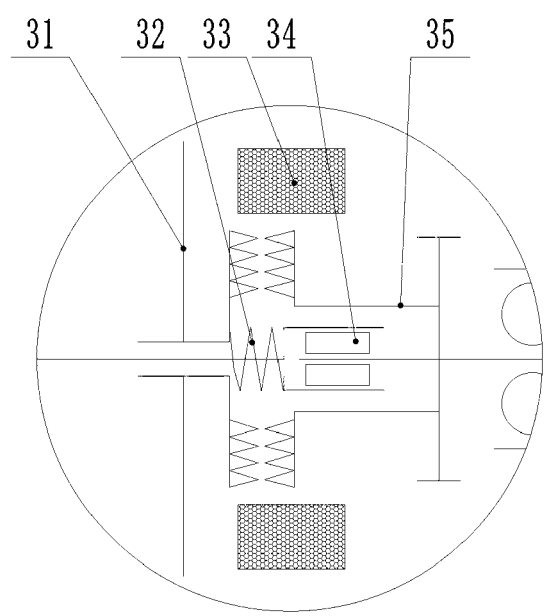
FIG. 3 is a schematic diagram of the structure of a differential locking mechanism (clutch) in FIG. 1.

Preferably, in a specific embodiment, as shown in FIG. 3, the differential locking mechanism comprises a movable toothed disc assembly 31, a fixed toothed disc assembly 35, a fixed electromagnetic coil 33 and a return spring 32. The movable toothed disc assembly 31 is slidably connected with the motor output shaft or the shaft of the idle gear or the gear shaft on one side by a spline, and can move along the shaft to be close to and engaged with the fixed toothed disc assembly 35 after the fixed coil 33 is energized. The fixed toothed disc assembly 35 is fixedly connected with the motor output shaft or the shaft of the idle gear or the gear shaft on the other side by a spline. The fixed electromagnetic coil is fixedly arranged on a casing adjacent to the movable toothed disc assembly. The return spring 32 is arranged between the movable toothed disc assembly and the motor output shaft or the shaft of the idle gear or the gear shaft which is on the same side with the movable toothed disc assembly, and is configured to push the movable toothed disc assembly back and keep it in its original position after the energized engagement is completed.

In an embodiment, the dual-motor drive assembly further comprises a parking mechanism. The parking mechanism comprises a parking gear, a parking pawl and a parking actuator. The parking gear is integrated on a fixed toothed disc of the fixed toothed disc assembly 35. The parking mechanism can adopt the existing specific structure, which will not be repeated here.

In an embodiment, the dual-motor drive assembly further comprises a cycloid pump, an inner rotor 43 of the cycloid pump is fixed on the shaft of the idle gear, and an outer rotor 44 of the cycloid pump is meshed with the inner rotor 43 of the cycloid pump. The cycloid pump sucks and presses oil by changing the sealed volume between the teeth. It comprises an oil distribution disc (front and rear covers), an outer rotor (a driven gear), and an inner rotor (a driving gear) eccentrically disposed in the pump body. It can suck oil when rotating to one angle range and discharge oil when rotating to another angle range, thereby realizing the circulation of oil in the casing of the drive system and increasing the cooling and lubrication of the drive system.

In an embodiment, the first gear transmission and the second gear transmission are arranged in a same transmission casing, the first motor and the second motor are fixedly connected to two sides of the transmission casing respectively, and are fixed at the end of the casing away from the driven wheel, while the end shaft of the gear transmission, such as the shaft where the second stage gear is located, is connected to the driven wheel through a universal joint.

In particular, in this embodiment, in order to arranging the vehicle frame and other mechanisms, a support bracket different from the prior art is provided. The transmission casing is provided on the support bracket, and the vehicle frame is also provided on the support bracket. The vehicle frame is a frame-typed structure that spans the front and rear axles of the vehicle, commonly known as a girder, and is a basic part of the vehicle. It is generally composed of two longitudinal beams and several cross beams, which are supported on the wheels through the suspension device, front axle and rear axle. Moreover, when a wheel needs to be connected, the wheel can be connected with the support bracket through a rocker arm.

In an embodiment, a rear bearing 11 of the first motor and a main bearing 14 of the first motor are respectively arranged on two sides of the first motor rotor 13 in a first motor casing, and are respectively located within an axial length range of outgoing lines of the first motor stator 12; a rear bearing 21 of the second motor and a main bearing 24 of the second motor are respectively arranged on two sides of the second motor rotor 23 in a second motor casing, and are respectively located within an axial length range of outgoing lines of the second motor stator 22, so as to reduce the axial length occupied by the bearings. Moreover, the ends of the output shaft of the first motor and the output shaft of the second motor are respectively provided with a shaft auxiliary bearing 16 of the first motor and a shaft auxiliary bearing 26 of the second motor, so as to improve the support stiffness of the output shafts, the first stage pinion I and the first stage pinion II, and achieve the effect of reducing noise.

Another aspect of the present disclosure also provides a vehicle comprising the dual-motor drive assembly described in any of the above embodiments.

The present disclosure is further described in detail by using the following two examples.

Example 1

The dual-motor drive assembly in the Example 1 is as shown in FIG. 1 and the above description. It should be pointed out that the differential lock mechanism in FIG. 1 can be realized by locking the output shaft 15 of the first motor and the output shaft 25 of the second motor with an electromagnetic clutch. Specifically, the following solution can be used. The movable toothed disc assembly 31 is slidably connected with the output shaft 15 of the first motor by a spline, and the fixed toothed disc assembly 35 is fixedly connected with the output shaft 25 of the second motor by a spline or the like. The parking gear is integrated on the fixed toothed disc, which can effectively reduce the number of parts and the axial size of the assembly. The fixed electromagnetic coil 33 generates an electromagnetic force when energized, and drives the movable toothed disc assembly 31 to move toward the fixed toothed disc assembly 35 and realize mutual meshing locking through the end teeth on the toothed discs, thereby realizing the function of locking the output shaft 15 of the first motor and the output shaft 25 of the second motor and realizing power coupling. The return spring 32 is arranged between the movable toothed disk assembly 31 and the output shaft 15 of the first motor. The function of the return spring 32 is to maintain the disconnection reliability of the differential lock when locking is not required. The required force provided by the return spring 32 is determined by the weight of the movable toothed disk assembly 31, the impact resistance and the corresponding time for returning to the original position, etc. In order to enhance the stability of the differential lock mechanism, an auxiliary support bearing may also be arranged on the output shaft of the second motor.

The parking mechanism comprises the parking gear (integrated with the fixed toothed disc), the parking pawl, the parking actuator, etc., which are not explicitly shown. When the parking is needed, the differential lock mechanism is locked, and then the parking mechanism performs the parking action, so as to achieve the object of locking the output shaft of the first motor and the output shaft of the second motor simultaneously by using one parking mechanism, and thus achieve the object of locking the wheels.

Example 2

The dual-motor drive assembly in the Example 2 is as shown in FIG. 2 and the above description. It should be pointed out that the differential lock mechanism can be realized by the idle gear I 42 and the idle gear II 52. Specifically, the following solution can be used. The movable toothed disc assembly 31 and the idle gear I 42 are slidably connected by a spline, and the fixed toothed disc assembly 35 and the idle gear II 52 are fixedly connected by a spline or the like. The parking gear is integrated on the fixed toothed disc, which can effectively reduce the number of parts and the axial size of the assembly. The fixed electromagnetic coil 33 generates an electromagnetic force when energized, and drives the movable toothed disc assembly 31 to move toward the fixed toothed disc assembly 35 and realize mutual meshing locking through the end teeth on the toothed discs, thereby realizing the function of locking the idle gear I and the idle gear II so as to achieve the locking of the first motor and the second motor, and realizing power coupling. The return spring 32 is arranged between the movable toothed disk assembly 31 and the idle gear I. The function of the return spring 32 is to maintain the disconnection reliability of the differential lock when locking is not required. The required force provided by the return spring 32 is determined by the weight of the movable toothed disk assembly 31, the impact resistance and the corresponding time for returning to the original position, etc.

The parking mechanism comprises the parking gear (integrated with the fixed toothed disc in this technical solution), the parking pawl, the parking actuator, etc. (not all explicitly shown). When the parking is needed, the differential lock mechanism is locked, and then the parking mechanism performs the parking action, so as to achieve the object of locking the idle gear I and the idle gear II simultaneously by using one parking mechanism, and thus achieve the object of locking the wheels.

The above only describes the embodiments of the present disclosure, and is not intended to limit the scope of protection of the present disclosure. Any modification, equivalent substitution, improvement, expansion, etc. made within the spirit and principle of the present disclosure shall all fall within the protection scope of the present disclosure.

What is claimed is:

1. A dual-motor drive assembly, wherein it comprises a first motor and a second motor arranged coaxially, a first gear transmission, a second gear transmission, and one or more idle gear pairs, the first gear transmission is driven by the first motor, the second gear transmission is driven by the second motor, and the idle gear pairs are respectively arranged in the first gear transmission and the second gear transmission and are configured to increase a distance between an output shaft of the first motor and an end shaft of the first gear transmission,
   wherein the first gear transmission and the second gear transmission are each a two-stage gear transmission, gears of corresponding stages in the first gear transmission and the second gear transmission are arranged on a same axis, and the idle gear pairs are respectively arranged between a pair of first stage gears, and/or between a pair of second stage gears, and
   further comprising: a differential locking mechanism arranged between two shafts of the idle gear pair; and
   a cycloid pump, an inner rotor of the cycloid pump is fixed on the shaft of the idle gear, and an outer rotor of the cycloid pump is meshed with the inner rotor of the cycloid pump.

2. The dual-motor drive assembly according to claim 1, wherein the first gear transmission and the second gear transmission respectively comprise a first stage pinion, a first stage gear, a second stage pinion and a second stage gear, and there is one idle gear pair which is arranged between the first stage pinions and the first stage gears.

3. The dual-motor drive assembly according to claim 1, wherein the differential locking mechanism comprises a movable toothed disc assembly, a fixed toothed disc assembly, a fixed electromagnetic coil and a return spring;
   the movable toothed disc assembly is slidably connected with the motor output shaft or the shaft of the idle gear or the gear shaft on one side by a spline, and the fixed toothed disc assembly is fixedly connected with the motor output shaft or the shaft of the idle gear or the gear shaft on the other side by a spline;
   the fixed electromagnetic coil is fixedly arranged on a casing adjacent to the movable toothed disc assembly; and
   the return spring is arranged between the movable toothed disc assembly and the motor output shaft or the shaft of the idle gear or the gear shaft which is on the same side with the movable toothed disc assembly.

4. The dual-motor drive assembly according to claim 3, wherein it further comprises a parking mechanism, the parking mechanism comprises a parking gear, a parking pawl and a parking actuator, and the parking gear is integrated on a fixed toothed disc of the fixed toothed disc assembly.

5. The dual-motor drive assembly according to claim 1, wherein the first gear transmission and the second gear transmission are arranged in a transmission casing, and the first motor and the second motor are fixedly connected to two sides of the transmission casing respectively; and the transmission casing is arranged on a support bracket, and a vehicle frame is also arranged on the support bracket, and a wheel is connected with the support bracket through a rocker arm.

6. The dual-motor drive assembly according to claim 1, wherein bearings of the first motor and bearings of the second motor are respectively arranged on two sides of a rotor in a motor casing, and are respectively located within an axial length range of outgoing lines of a stator of the first motor and a stator of the second motor; and ends of the output shaft of the first motor and the output shaft of the second motor are respectively provided with a shaft auxiliary bearing of the first motor and a shaft auxiliary bearing of the second motor.

7. A vehicle comprising the dual-motor drive assembly according to claim 1.

8. The dual-motor drive assembly according to claim 1, wherein the first gear transmission and the second gear transmission are arranged in a transmission casing, and the first motor and the second motor are fixedly connected to two sides of the transmission casing respectively; and the transmission casing is arranged on a support bracket, and a vehicle frame is also arranged on the support bracket, and a wheel is connected with the support bracket through a rocker arm.

9. The dual-motor drive assembly according to claim 1, wherein bearings of the first motor and bearings of the second motor are respectively arranged on two sides of a rotor in a motor casing, and are respectively located within an axial length range of outgoing lines of a stator of the first motor and a stator of the second motor; and ends of the output shaft of the first motor and the output shaft of the second motor are respectively provided with a shaft auxiliary bearing of the first motor and a shaft auxiliary bearing of the second motor.

10. A vehicle comprising the dual-motor drive assembly according to claim 2.

11. A vehicle comprising the dual-motor drive assembly according to claim 3.

12. A vehicle comprising the dual-motor drive assembly according to claim 4.

13. A vehicle comprising the dual-motor drive assembly according to claim 5.

14. A vehicle comprising the dual-motor drive assembly according to claim 6.

* * * * *